Patented Mar. 4, 1952

2,587,992

UNITED STATES PATENT OFFICE 2,587,992

DRY PROCESS FOR AGGLOMERATING WOOD PARTICLES

Siegfried Glaubert, Neuilly-sur-Seine, France

No Drawing. Application October 30, 1948, Serial No. 57,627. In France January 10, 1948

3 Claims. (Cl. 106—163)

Various processes are known in prior art for the manufacture of agglomerates from wood and the like, particularly in the shape of waste scrap. These processes consist in that, after having adequately broken up and suitably treated the wood, its fragments are agglomerated by means of suitable binders, generally substances of the resin type, whereupon the mass is subjected to pressure and is given the required shape. It is also possible to defibrate the wood by dry or by damp processing with a view to felting, in accordance with the technique common in paper or cardboard work.

An object of the present invention consists in the utilization of lignin contained in the wood scrap and the like in a process for agglomerating said wood scrap.

Another object is to use simultaneously certain reagents capable of treating wood and to provide in situ a successive tempering and catalytic action during a heat treatment under pressure of wood scrap.

In accordance with the invention, wood scrap is firstly treated under a vacuum or under normal atmospheric pressure, by a weak acid, cold or hot. This softens the lignin to allow it to play its part in the agglomeration of wood scrap.

The mass thus obtained is then subjected, under atmospheric pressure, cold or hot, to the action of organic products containing 5 or 6 carbon atoms in their molecules, such as furfuryl alcohol, or a substance having an alcohol function and a melting point which is between 150 and 170° C. To this mixture is added a strong acid having an action of acceleration and catalysis. Preferably, a sulphur compound is added. The above mentioned strong acid and the sulphur compound may be one and the same substance, namely sulphuric acid.

The mass thus obtained is subjected to a pressure of about 20 kilograms per square centimeter, depending upon the relative amount of lignin contained in the raw material, while heating to about 120° C. Thus an agglomerated, moisture proof product having a great hardness is obtained; this product offers properties which are intermediate between those of natural wood and those of a plastic material. It may be machined with the utmost ease. If it is desired to increase its water resisting qualities, it may be subjected to the action of a basic or acid product or of a resin, which is projected, for instance, by means of a compressed air pistol.

Acids used in this process may be selected from all acids which do not react with the acetic acid formed in the wood during the process. By way of example, the weak acid may consist of boric or valeric acid.

By way of nonlimitative example, a mass of wood scrap may be subjected to the following treatment:

The mass is first treated, under atmospheric pressure or a pressure of 200 mm. of mercury, by a 22% solution of valeric acid, the proportion by weight of the solution to the wood scrap being from 0.25 to 0.50%. Thus it will be seen that the said weak acid will represent between .05½% to about .11% by weight of the entire mass.

This treatment is followed by the mixing, in a mixer, with an aqueous solution at 15% of concentrated sulphurous acid, the proportion of this solution being of 0.25 to 0.50% of the weight of the wood scrap used as a raw material, thus leaving approximately .04% to .08% by weight of sulphurous acid in the mass of wood scrap. There is added also from 1 to 3% of an organic product having a high melting point, containing 5 to 6 carbon atoms in its molecule and having an alcohol function. The whole is mixed during about 1 to 10 minutes at room temperature. The mass thus obtained is subjected to pressure and heat as has been mentioned above.

As can be seen, the additions of various products to the mass are made in very weak proportions, much lower than the additions of resinous binders used heretofore. This is due to the fact that in accordance with the present invention, the binder consists to a large extent of the lignin of the wood itself, the lignin being made suitable by the treatment to fulfill the part of a binder. Another reason for the small quantity of products added is that all these products are very fluid, namely, much more so than the usual resinous binders, so that they penetrate more easily all the particles of the mass.

The process in accordance with the present invention offers the advantage of being able to utilize as they are, and without any special precautions, wood scrap constituted by products such as chips, saw dust, etc. The process is applicable irrespective of the essence or the hygrometric condition of the wood scrap. It is obvious that depending upon the amount of water contained in the scrap, it may be necessary to change the proportions of the products indicated by way of example as well as their concentrations. If the water contents of the scrap exceeds 13% it is preferable, although not necessary, to subject wood scrap to a partial drying before treating them by the process.

It must be understood that the invention is not limited to the mode of treatment which has been indicated, and that within the scope of the invention, the order of sequence of the operations, the nature and the concentrations of acids can be modified. For example, in some instances it may be advisable to treat wood scrap first with the strong acid and then with the weak one.

In particular, the invention covers the following variants:

The product added, containing 5 to 6 atoms of carbon, having an alcohol function and a high melting point may be replaced, in the same proportion with respect to the raw material, by a product having the same characteristics, except that the alcohol function may be replaced by an aldehyde function.

Further, in addition to or instead of the above mentioned product, a resin, preferably alkaline and fluid, can be added to the mixture.

After mixing and before molding under pressure, the mass may be subjected to a more or less prolonged heating at a relatively low temperature. In some cases, this treatment accelerates the agglomeration of the material during the molding under pressure.

Normally the acids employed are gradually organically bound by the OH functions of the cellulose molecules, and no means are required to absorb the possible residue of free acids which may remain, as for instance if the paste is not well mixed. If it is desired to speed up this absorption, the boards can be placed into chambers where ammonia gases, or any other suitable alkaline gas is contained.

It is apparent that the described method of treating wood scrap is a dry method, as distinguished from wet methods known in prior art.

It must also be understood that the invention is applicable not only to wood but to all products containing ligno-cellulose. Further, if the amount of lignin is not sufficient for the products to give, as such, a satisfactory agglomerate, the invention covers the possibility of adding to these raw materials products containing a large amount of lignin or pure lignin.

It is apparent that the described dry process requires trifling quantities (1 to 2% in weight) of reagents. Furthermore, contrary to prior art processes, the temperature and pressure need not exceed 212° F. and 300 lbs. per square inch, respectively. The low temperature involved eliminates the risk of flaws and burstings. The final product consists of a board of homogenous texture, which is physically and chemically inactive and which does not break down when immersed in water.

It is further apparent that the illustration shown above has been given solely by way of illustration and not by way of limitation, and is subject to wide variations and modifications within the scope of the present invention.

What is claimed is:

1. A dry process for agglomerating wood particles containing lignin comprising the steps of adding to a mass of said particles a solution of a weak acid containing between about .055% to about .11% by weight of acid to the said mass, and said solution being between about .25% to .50% by weight of solution to the said mass; then adding a solution of a strong mineral acid containing between about .04% to .08% by weight of strong acid to the said mass and said solution of strong acid being between about .25% to .50% by weight of solution to the said mass; and subjecting the said mass to moderate heat and pressure.

2. A dry process for agglomerating wood particles containing lignin comprising the steps of adding to a mass of said particles a solution of a weak acid containing between about .055% to about .11% by weight of acid to the said mass, and said solution being between about .25% to .50% by weight of solution to the said mass; then adding a solution of a strong mineral acid containing between about .04% to .08% by weight of strong acid to the said mass and said solution of strong acid being between about .25% to .50% by weight of solution to the said mass; and subjecting the said mass to heat and pressure between about 100° C. to 120° C. and 300 p. s. i. to 400 p. s. i. respectively.

3. A dry process for agglomerating materials containing ligno-cellulose by adding to a mass of the ligno-cellulose a 22% solution of valeric acid, the proportion by weight of the solution to the ligno-cellulose being in the range of 0.25 to 0.50%, then mixing therewith an aqueous solution of 15% sulphurous acid, the proportion of the solution to the ligno-cellulose being in the range of 0.25 to 0.50% of the weight of the ligno-cellulose used as a raw material, mixing the mass, and subjecting it to a pressure of substantially 20 kilograms per square centimeter at a temperature of substantially 120° C.

SIEGFRIED GLAUBERT.

REFERENCES CITED

The following references are of record in the file of this patent:

UNITED STATES PATENTS

| Number | Name | Date |
|---|---|---|
| 65,533 | Bishop | June 11, 1867 |
| 726,029 | Classen | Apr. 21, 1903 |
| 1,923,756 | Sherrard et al. | Aug. 22, 1933 |
| 2,156,159 | Olson | Apr. 25, 1939 |
| 2,381,205 | Caughey | Aug. 7, 1945 |
| 2,427,966 | Hirschler | Sept. 23, 1947 |

OTHER REFERENCES

Sherrard, "Farm Chemurgic Journal," vol. I, 1937–38, No. 2, March 1938, pp. 63–66.